United States Patent [19]

Berman

[11] Patent Number: 4,537,030
[45] Date of Patent: Aug. 27, 1985

[54] OCEAN THERMAL ENERGY SYSTEM

[76] Inventor: Daniel Berman, Rehov Harav Friedman 49, Tel Aviv, Israel

[21] Appl. No.: 446,649

[22] Filed: Dec. 3, 1982

[51] Int. Cl.³ .............................................. F03G 7/04
[52] U.S. Cl. .................................. 60/641.7; 60/641.6
[58] Field of Search .................. 60/641.6, 641.7, 641.1

[56] References Cited

U.S. PATENT DOCUMENTS 1,952,520  3/1934  Urquhart ........................ 60/641.7 X

FOREIGN PATENT DOCUMENTS 69980  1/1959  France ................................ 60/641.7

Primary Examiner—Stephen F. Husar
Attorney, Agent, or Firm—Browdy and Neimark

[57] ABSTRACT

An ocean thermal energy apparatus comprising a fluid cooling compartment, a fluid heating compartment, fluid conduits conducting cooled fluid from the fluid cooling compartment to the fluid heating compartment, generating apparatus, and pump apparatus to return fluid from the generating apparatus to the fluid cooling compartment. In particular, such an apparatus designed to float in the ocean such that the fluid cooling compartment is disposed deeper in the ocean in colder water, and the fluid heating compartment is disposed in a shallower position in warmer water, yet remaining in fluid communicating relationship.

1 Claim, 2 Drawing Figures

OCEAN THERMAL ENERGY SYSTEM

FIELD OF THE INVENTION

The present invention relates to apparatus for extracting energy from ocean thermal energy sources.

BACKGROUND OF THE INVENTION

In recent years, the oceans have begun to be tapped as sources of extractable thermal energy. The abundance of water at varying temperatures has been utilized in a number of systems as a heat transfer agent.

It has been proposed to utilize the ocean thermal energy in a Rankine cycle process to generate electrical energy. One such proposal, by the Lockheed Corporation, comprises pumping water through pipes for cooling the refrigerant which performs the work. Vast amounts of water are required to be pumped, requiring massive pumps which have not yet been designed and successfully manufactured. Maintenance and repair of such tremendous pumps would require huge handling equipment and greatly increase the cost of the system.

The pipes which would be utilized in such a system, if made of steel or other heavy, corrosion resistant, high strength metal, would be very heavy due to the wall thickness required to keep pipe deflections, caused by thermal differences and ocean currents, at a manageable level. This would then necessitate the use of large buoyancy tanks to keep the unit afloat. Such tanks would need variable buoyancy control which would consume some of the power generated by the system.

A particular disadvantage of this sort of system is the problem of biofouling and other marine environmental problems. Fish and plant life can be pumped into the system along with the ocean water, as well as ocean sediments which cause corrosion.

In mini-OTEC tests (Ocean Thermal Energy Conversion testing done on floating ships), a 50 KW output has been produced. Of this output, it is estimated that 45 KW was needed to operate the equipment, leaving only 5 KW available for transmission. Thus, to make a 300 mega-watt delivery OTEC, such as proposed by Lockheed, would require a unit capable of developing 3000 mega-watts.

SUMMARY OF THE INVENTION

It is thus an object of the present invention to provide a system for converting ocean thermal energy to useful electrical energy which is of relatively simple construction, practical and relatively inexpensive to manufacture and maintain, and which will operate at greater efficiency than have such systems heretofore.

There is thus provided in accordance with the present invention ocean thermal energy apparatus comprising a fluid cooling compartment, a fluid heating compartment, fluid conduit conducting cooled fluid from the fluid cooling compartment to the fluid heating compartment, generating apparatus, and pump apparatus to return fluid from the generating apparatus to the fluid cooling compartment. In particular, there is provided such an apparatus designed to float in the ocean such that the fluid cooling compartment is disposed deeper in the ocean in colder water, and the fluid heating compartment is disposed in a shallower position in warmer water, yet remaining in fluid communicating relationship.

There is further provided in accordance with the present invention a method of generating electrical energy from ocean thermal energy comprising causing a working fluid to flow through levels of water of gradually increasing temperature to cause preheating of the fluid, heating said fluid in a fluid heating compartment to a hot gas, causing said gas to flow through generating apparatus for the working thereof, causing the gas to flow from the generating apparatus through levels of water of gradually decreasing temperature to cause cooling of the gas, and condensing of the gas in a fluid cooling compartment.

There is still further provided in accordance with an embodiment of the present invention ocean thermal energy apparatus comprising a fluid cooling compartment disposed in a deep, cool layer of ocean water, a fluid heating compartment disposed in a shallow, warm layer of ocean water in fluid receiving relationship with the fluid cooling compartment, generating apparatus disposed in fluid receiving relationship with the fluid heating compartment, and fluid conduits conducting fluid from the fluid cooling compartment through the fluid heating compartment to the generating apparatus and back to the fluid cooling compartment.

BRIEF DESCRIPTION OF THE DRAWINGS

The apparatus of the present invention will be further understood and appreciated from the following detailed description taken in conjunction with the drawings in which.

DETAILED DESCRIPTION OF THE INVENTION

Figure 1:
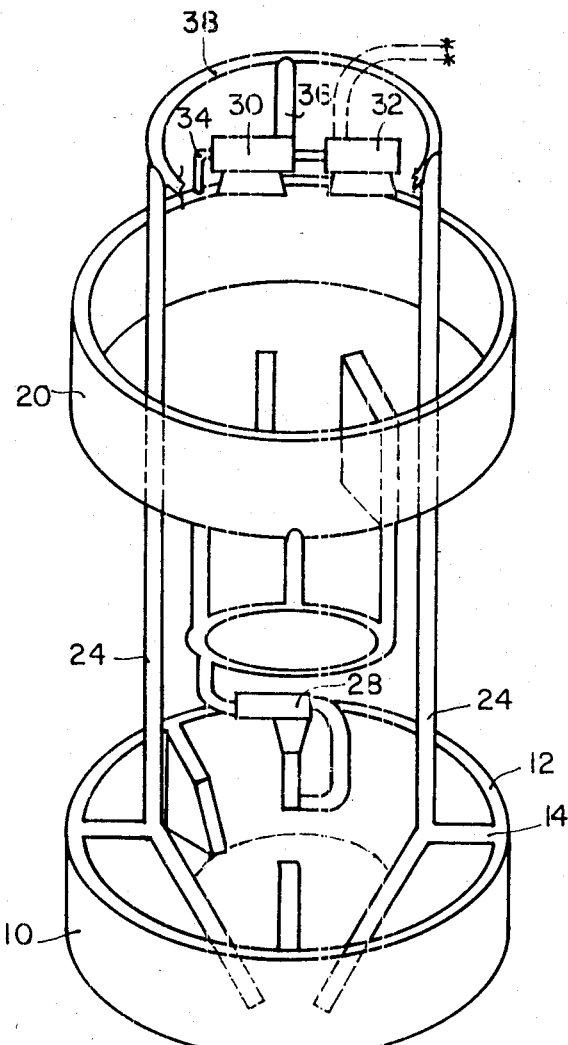
FIG. 1 is an illustration of an embodiment of the ocean thermal energy apparatus of the present invention.
Figure 2:
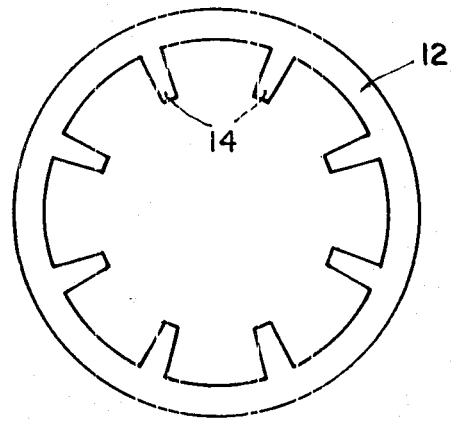
FIG. 2 is a top view illustration of an embodiment of a fluid heating or fluid cooling compartment for use in the present invention.

With reference to FIG. 1 there is shown an embodiment of the ocean thermal energy apparatus of the present invention. It comprises a fluid cooling compartment 10 for the cooling and condensing of a working fluid. As can be seen with reference to FIG. 2, fluid cooling compartment 10 may comprise a hollow collecting ring 12 provided with a plurality of hollow, tapered fins 14. This sort of design provides a relatively large surface area across which heat transfer can take place.

With further reference to FIG. 1, there is also provided a fluid heating compartment 20 for the heating of the working fluid to a gas. Fluid heating compartment 20 may be of similar design to fluid cooling compartment 10.

Connecting fluid heating compartment 20 and fluid cooling compartment 10 are exhaust conduits 24. Exhaust conduits 24 conduct hot fluid down to fluid cooling compartment 10 at the end of each generating cycle, described in detail hereinbelow.

Fluid cooling compartment 10 and fluid heating compartment 20 are also connected by fluid conduits 26 via pump 28. Pump 28 pressurizes condensed working fluid and pumps it from fluid cooling compartment 10 to fluid heating compartment 20 at the beginning of the generating cycle.

Generating means, such as turbine 30 and generator 32 are provided in communication with fluid heating compartment 20. Heated fluid enters generating means at its inlet 34 and exhaust fluid is released from outlet 36.

Exhaust fluid is carried via conduit 38 to exhaust conduits 24.

The method of operation of the present invention is as follows. A working fluid, preferably ammonia, is condensed and pumped from fluid cooling compartment 10 through pump 28 into fluid conduits 26. Fluid conduits 26 are made of marine construction steel or any other suitable material to permit the working fluid to absorb heat from the ocean water flowing about them. As the working fluid becomes warmer, it rises due to convection as well as due to the action of pump 28. As it rises, the working fluid passes through layers of progressively warmer water from which it absorbs more heat until it reaches fluid heating compartment 20.

In fluid heating compartment 20, the preheated working fluid is heated to a hot gas. The hot gas flows into generating means such as turbine 30 causing it to run generator 32 to produce electrical energy which is utilized where needed.

The exhaust gas which flows out of turbine 30 passes through conduit 38 to exhaust conduits 24. As it passes through the water, the hot exhaust gas releases some of its heat into the ocean waters which flow around exhaust conduits 24. The cooling fluid continues to cool as it flows downward through levels of water which become progressively colder. As it approaches the deep colder water layers, the working fluid increases in density and hydrostatic pressure. This facilitates condensation and liquification of the fluid from a gas to a liquid. The cooled fluid returns to fluid cooling compartment 10 where it is once again pressurized and pumped upwards. It will be appreciated that the increased density and hydrostatic pressure of the working fluid lessen the pumping energy required to increase the pressure of the working fluid to begin the cycle once again. This cycle is substantially continuous.

It will be appreciated that the ocean water heated by the exhaust gas will rise by convention. It will thus be available as a heat source for the preheating of the working fluid in fluid conduits 26. And the rising warmer water creates a natural convection to bring colder water to the lower level heat transfer surfaces.

It is a particular feature of the present invention that a simple, relatively light-weight apparatus is provided which is capable of providing the needed electrical power output due to the fact that only the working fluid is pumped through the system, rather than pumping the cooling water through a system of heat exchangers. The cool water flow required to bring gaseous $NH_3$ (working fluid) to liquid $NH_3$ through heat exchangers, for example, is estimated to be at least 12 times that required if the $NH_3$ is pumped through the cool water area instead. An advantage of this design is that there is little or no bio-fouling as the working fluid is circulated within a closed loop and the ocean water never need enter the apparatus. Thus, internal corrosion of pipes and pumps from ocean sediments is eliminated, resulting in a longer life time of the equipment and relatively low maintenance costs. A further advantage of this system is the ease of cleaning and repair of the apparatus.

Yet another advantage of the present invention is that, due to its relatively small size and light weight, the ocean energy apparatus may be utilized closer to shore in shallower water than that needed for the massive units proposed to date. Appropriate design of the fluid and exhaust conduits will result in the stablized bouyancy of the unit. Thus, additional buoyancy tanks would essentially be unnecessary, and the bouyancy effect would be self-adjusting.

It is a particular feature of the present invention that only on the order of 50% of the power generated by the apparatus is required to run the apparatus. Thus, 50% of the output is available for transmission, so a much smaller apparatus is capable of producing the desired output than in present systems.

It will be appareciated by those skilled in the art that the present invention is not limited to what has been specifically described and illustrated hereinabove. Rather, the scope of the invention is limited solely by the claims which follow.

I claim:

1. A method of generating electrical energy from ocean thermal energy comprising:

pressurizing a working fluid at a low temperature in a relatively cool, deep layer of ocean water;

conducting said fluid through thermally conductive working fluid conduits disposed so as to pass through progressively warmer layers of ocean water such that said fluid is preheated by absorbing heat from said ocean water;

heating said preheated fluid to a hot gas in a thermally conductive working fluid heating compartment disposed in a shallower, warmer layer of ocean water by heat transference from said ocean water;

causing said hot gas to pass through generating means so as to generate electrical energy;

conducting said hot gas from said generating means through thermally conductive exhaust conduits disposed so as to pass through progressively cooler layers of ocean water such that said gas is cooled by releasing heat to said ocean water; and cooling and condensing said gas in a thermally conductive working fluid cooling compartment disposed in a deep, cool layer of ocean water by heat transference to said ocean water;

the preceding steps being conducted in the absence of a step of circulating ocean water relative to said compartments.

* * * * *